July 30, 1940.     C. P. XENIS     2,209,743
INSULATING PAD FOR ELECTRICAL JUNCTIONS
Filed May 19, 1939
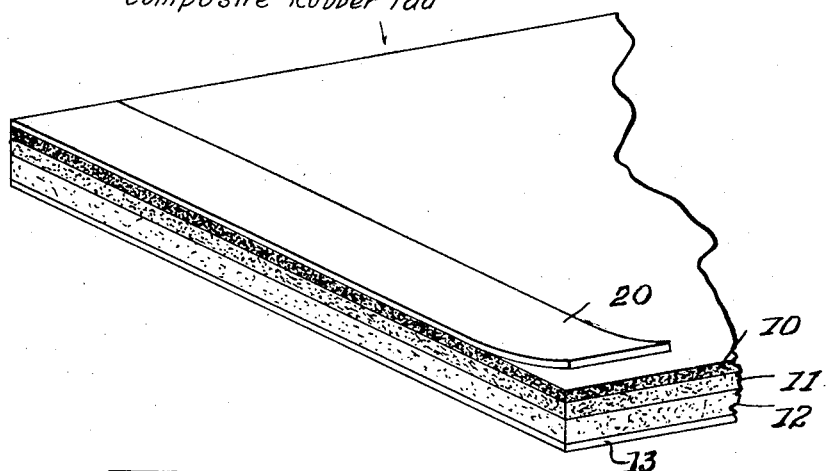
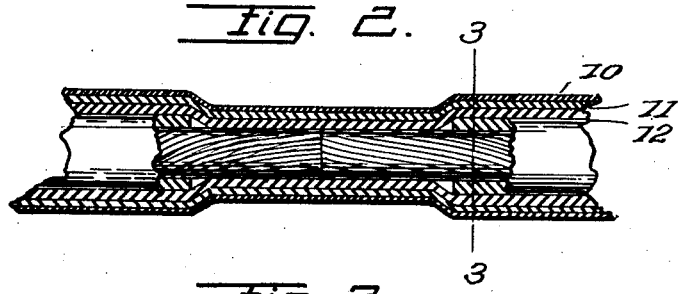
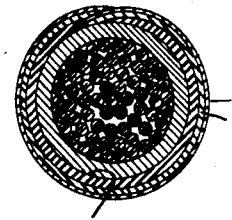
Inventor
Constantine P. Xenis
By
Attorney Patented July 30, 1940

2,209,743

UNITED STATES PATENT OFFICE 2,209,743

INSULATING PAD FOR ELECTRICAL JUNCTIONS

Constantine P. Xenis, Little Neck, Long Island, N. Y., assignor to Consolidated Edison Company of New York, Inc., New York, N. Y., a corporation of New York Application May 19, 1939, Serial No. 274,658

2 Claims. (Cl. 173—244)

This invention relates to the art of electrical insulation and more particularly to pads or sheets of material adapted to insulate electrical conductors in such a manner as to form a smooth insulating covering even over junctions of irregular shape. The new insulation also has the advantage of long life, that is, very slow deterioration.

Rubber tapes for wrapping electrical conductor joints are already known. Such tapes generally comprise a strip of unvulcanized or only slightly vulcanized rubber having a layer of protective paper or fabric applied on one surface so that when furnished in a roll adjacent layers will not adhere to one another. Complete vulcanization is not incorporated in this material because fully vulcanized rubber does not possess plasticity or adhesiveness. The tape, being essentially unvulcanized, possesses less resistance to aging resulting from exposure to atmospheric conditions, particularly at high operating temperatures than if it had been fully vulcanized. The known tapes are fairly satisfactory for use with small conductors such as telephone, housewiring, and other small wires. In such uses the labor associated with the application of the relatively small amount of tape required for the insulation of the joint is not excessive. Further, the tendency of the rubber to slowly deteriorate under the relatively low operating temperature is not sufficient to render the use of such tapes disadvantageous. On the other hand, the joints on large power cables require the application of large amounts of tape, an operation requiring considerable expenditure of time and labor. Further, these cables and joints reach relatively high operating temperatures which induce rapid deterioration due to aging of the insulating tape. This aging action starts on the outer surface of the insulated joint, which surface is subject to the oxidation from the air.

It has now been found that rubber can be better adapted to the insulation of large electrical conductors and particularly large irregularly shaped joints, by providing a sheet in the shape of a pad or tape which has one surface of vulcanized rubber and one surface of plastic unvulcanized rubber. The material so formed not only molds itself easily over the more complicated of structures, and adheres closely and firmly, but it also has a longer life, with less tendency to deteriorate from oxidation and other deteriorating elements. This improvement is obtained from the fact that the exposed surface of the joint insulated with the new insulating pad is fully vulcanized and consequently better able to resist deterioration.

The problem is not entirely solved by the use of a tape of this type, however, for the underlying layer of unvulcanized rubber, if it remains unvulcanized, lacks the strength in permanent adhesive qualities that are desirable and the tape does not form as strong and rugged a covering as has been found desirable. If the whole covering could be made of vulcanizable rubber and vulcanized in place on the cable a very desirable covering would be obtained but this is not practical because of the expense of performing this vulcanization at each cable junction. The present invention, however, provides a method which eventually results in thoroughly vulcanized, completely integral and unitary cable covering that has the desired strength and at the same time is molded tightly in the place against the cable.

For this purpose there is provided a sheet of vulcanized rubber faced with a sheet of unvulcanized rubber and the sheet of vulcanized rubber contains ingredients that will in time and under the temperature conditions to which the tape will be subjected in its use about a cable, migrate into the unvulcanized layer and cause its vulcanization. Therefore, when the tape is wrapped about a cable junction, the outer layer, which is the vulcanized layer, presses the unvulcanized material into the interstices of the junction making a tight fitting unitary covering. Then, under the influence of the heat from the cable in its normal operation, the necessary ingredient or ingredients migrate from the vulcanized layer into the unvulcanized layer and cause it too to become vulcanized so that the final covering is a unitary vulcanized, tight fitting insulation.

The nature of the invention and its inherent advantages will be more fully understood from a consideration of the following detailed discussion in connection with the accompanying drawing, wherein:

Figure 1 is a partial perspective view of a section of a sheet of insulation prepared in accordance with the principles of this invention;

Figure 2 is a view of a cable joint showing the nature of the surfaces that are to be insulated, and Figure 3 is a cross-section through the electrical conductor joint of Figure 2 along line 3—3 insulated in accordance with the invention herein disclosed.

It has been found that a highly satisfactory insulating material having a total thickness of approximately ¼ inch comprises three layers as shown in Figure 1. The insulating sheet comprises about 1/16 of an inch of vulcanized rubber forming one surface of the sheet and designated as layer 10, an intermediate layer 11 of partially vulcanized rubber about 1/16 of an inch in thickness and a layer 12, 1/8 of an inch thick, consisting of unvulcanized plastic rubber, which provides the surface intended for application to a conductor. A sheet of holland cloth 13 is applied to the plastic surface of layer 12 to protect the same prior to use.

All three rubber layers of the sheet material are impregnated with an ample quantity of a rubber antioxidant to inhibit deterioration during the life of the insulation. It is preferred that the insulating material be made up in the shape of pads adapted to enclose electrical conductor joints of normal characteristics. A supply of such pads may be kept in stock for application to the several types of joints normally encountered in electrical equipment.

In preparing the novel insulating material of this invention antioxidants and vulcanizing ingredients are added to the unvulcanized rubber in suitable amounts, the three layers are formed and the unit is subjected to vulcanizing treatment. Layer 10 before vulcanization consists of unvulcanized rubber having dispersed therein the full amount of antioxidant required to inhibit deterioration from aging and the full amount of vulcanization ingredient required for complete vulcanization of the rubber. Layer 11 comprises unvulcanized rubber containing the full amount of antioxidant and a lesser amount of vulcanizing ingredients than that added to layer 10. Preferably layer 11 contains about 50% of the amount of vulcanizing ingredients required for full vulcanization during the time the rubber is in the vulcanizing mold. Layer 12 lacks at least one of the essential vulcanizing ingredients but is provided with the full amount of antioxidant. According to one method of manufacture which had been found to produce good results the several layers are placed in a mold with the holland cloth next to a bottom plate which is cooled by the flow of water through a jacket. Layers 12, 11 and 10 overlie the holland cloth in that order. The top plate of the mold is pressed down upon layer 10 with a suitable pressure and heat is applied thereto while the lower plate is maintained in a cold state by circulating water.

This operation results in a unitary sheet having a thin layer of fully vulcanized rubber at one surface and an intermediate thin layer of rubber which is relatively plastic because the amount of vulcanization ingredients dispersed therein was insufficient to produce full vulcanization, and a plastic layer which has undergone no vulcanization because it has been kept cool and is lacking in at least one essential vulcanizing ingredient. The surface of the latter layer is covered by a sheet of holland cloth. It will be seen therefore that three-fourths of the thickness of the pad consists of rubber in a plastic state which is well adapted to flow into the irregularities of a conductor joint and obviate the necessity for several layers of the usual rubber tape. Preferably the sheet material is cut into pads of more or less standardized shapes and sizes in order that it may be applied directly to a joint by removing the holland cloth and wrapping the pad about the joints under tension. The pressure applied by the normal tension of application will cause the plastic inner surface of the tape to flow into and fill irregularities in a joint which is essentially a combination of conical and cylindrical surfaces While I do not desire to be limited to the exact proportions, it may be stated for the purpose of illustration only the various layers of rubber may be made up of the following composition to insure proper treatment in vulcanizing, to obtain the desired results.

Layer 10 may be composed of approximately 40% rubber containing vulcanizing ingredients and antioxidants and 60% inorganic fillers. Layer 11 may be composed of approximately 20% rubber containing vulcanizing ingredients and antioxidants; 20% rubber containing antioxidants only; and 60% inorganic fillers. Layer 12 may be composed of 40% rubber containing antioxidants and 60% inorganic fillers.

In Fig. 1, I have shown a strip, 20, of cloth or the like along one edge of the vulcanized layer 10. The purpose of this strip, when removed prior to use of the pad, is to insure a clean surface for the unvulcanized edge of layer 12, to adhere readily to the vulcanized surface adjacent the edge of layer 10 when wrapping the pad around a joint. Of course this strip is only employed when the pads are made up in specific shapes and sizes.

Figures 2 and 3 illustrate one way a conductor joint may be effectively insulated in accordance with the principles of this invention. The ends of two conductors 14 are brought together to form a joint. Upon applying the insulating pad to the joint, depressions in the surface are filled with rubber in a plastic state. The edges of the sheet may be beveled to overlap, as at 15 in Figure 3, or because of its nature the material may be pressed to form a tapered or beveled edge. Thus, the conductor is covered with an integral sheath of insulating material which completely fills irregularities on the surface of the conductor joint.

After the insulating pad has been applied to the joints there is a tendency for the vulcanization ingredients in the outer portion of the insulation to migrate very slowly through the plastic rubber from those portions of the pad which contain them. By reason of this phenomenon the plastic rubber will slowly become vulcanized under the normal heat encountered by exposure to the atmosphere or generated by the conductor itself. Substantial vulcanization of the plastic portion of the insulation requires a period of years but it will be seen that the insulating pad is thereby improved as to durability and strength during the period required for vulcanization of the originally plastic rubber.

It will be readily understood that the insulating material may be formed as a tape, pad, or in any other desired shape.

I claim:

1. A method of insulating junctions in electrical conductors that comprises wrapping tightly about the junctions, a resilient unitary sheet or pad including a layer of unvulcanized rubber lacking in at least one ingredient necessary for low temperature vulcanization but otherwise susceptible of vulcanization by heat incident to current flow through the conductor, and an adjacent layer of at least partially vulcanized rubber, containing a migratory type of said missing ingredient, the pad being wrapped under tension about the junction in such a manner that the unvulcanized layer lies next to the junction and through plastic flow and tension fills the interstices of the junction, and subsequently the ingredient is caused to migrate from the vulcanized into the unvulcanized layer and under heat from the current flow in the conductor incident to normal use the unvulcanized layer becomes vulcanized.

2. A method of insulating junctions in electrical conductors that comprises wrapping tightly about the junctions, a resilient unitary sheet or pad including a layer of unvulcanized rubber lacking in at least one ingredient necessary for low temperature vulcanization but otherwise susceptible of vulcanization by heat incident to current flow through the conductor, a layer of rubber adjacent said first layer and containing a migratory type of said ingredient, and a third layer of vulcanized rubber adjacent said second layer, the pad being wrapped under tension about the junction in such a manner that the unvulcanized layer lies next to the junction and through plastic flow and tension fills the interstices of the junction, and subsequently under heat from the current flow in the conductor incident to normal use the ingredient is caused to migrate from the second layer into the unvulcanized first layer and the unvulcanized layer becomes vulcanized.

CONSTANTINE P. XENIS.